July 23, 1940.  J. T. MEDLER  2,208,997
CHEMO CUP
Filed Aug. 4, 1938
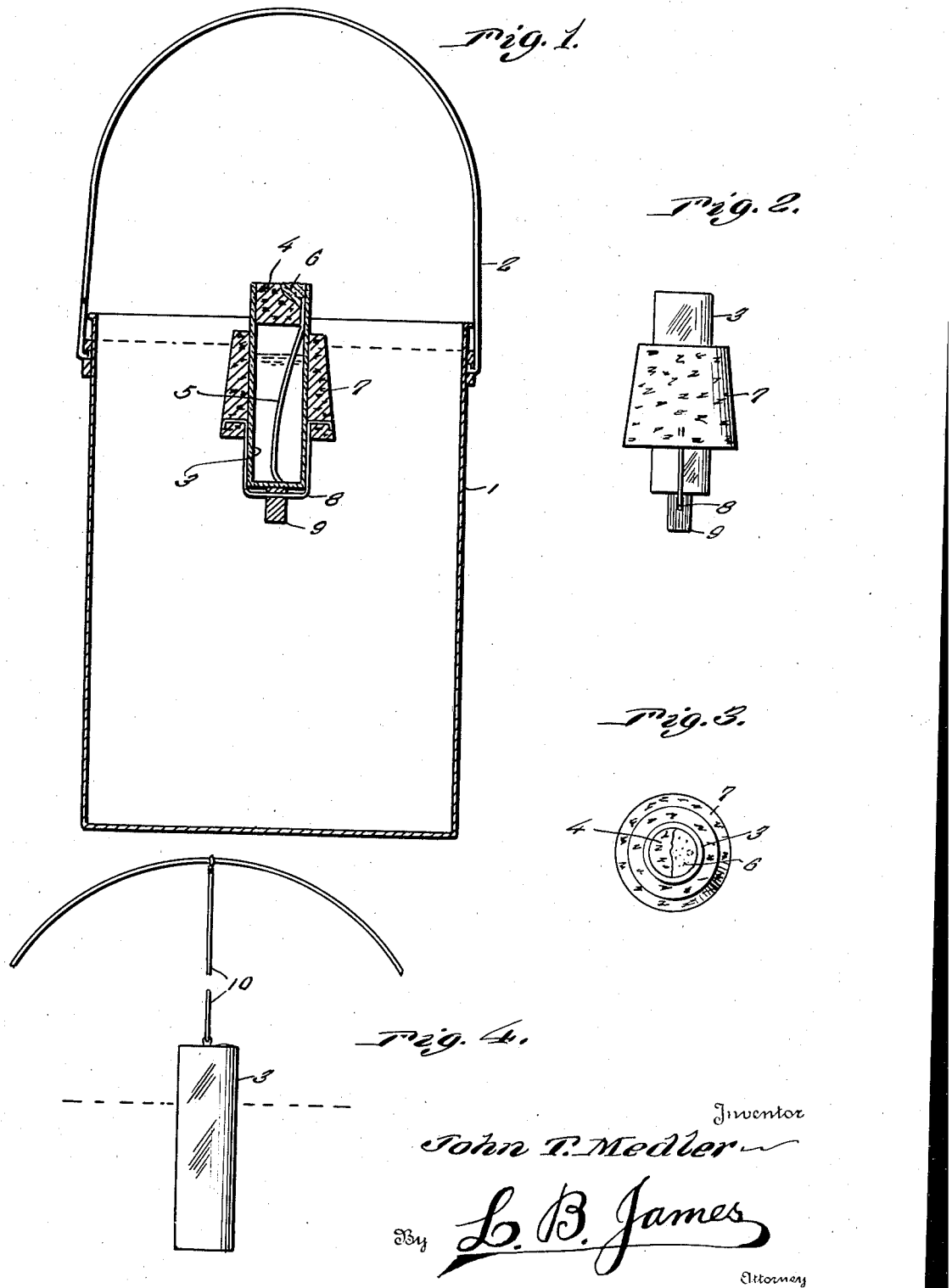
Inventor
John T. Medler
By L. B. James
Attorney Patented July 23, 1940

2,208,997

UNITED STATES PATENT OFFICE 2,208,997

CHEMO CUP

John T. Medler, St. Paul, Minn.

Application August 4, 1938, Serial No. 223,085

6 Claims. (Cl. 299—20)

This invention relates to a bait holder for insect traps, the general object of the invention being to provide means whereby the odors of the bait can escape slowly and continuously with but a slow evaporation of the liquid bait.

The invention also consists in certain other features of construction, combination and arrangement of the several parts, to be hereinafter fully described, illustrated in the accompanying drawing and specifically pointed out in the appended claims.

In describing the invention in detail reference will be had to the accompanying drawing wherein like characters denote like or corresponding parts throughout the several views, and in which:

Fig. 1 is a vertical sectional view through a trap and one form of the bait holder.

Fig. 2 is an elevation of the holder.

Fig. 3 is a top plan view of the holder.

Fig. 4 is a fragmentary elevational view showing a modified form of the holder.

In this drawing, the numeral 1 indicates a trap, which is made in the form of a pail for containing water or other liquid, and the numeral 2 indicates the handle of the pail. However, it is to be understood, that different kinds of traps may be used.

Referring to Figs. 1, 2 and 3, the liquid bait holder is shown at 3, and is preferably formed of a glass vial having its upper end open, but this end is closed by a cork, or other type of stopper 4, which has a recess formed in its top at one side thereof. A wick 5 has its upper end located between the lower part of the stopper and the inner surface of the upper part of the vial and extends along the stopper into the recess, with the major part of the wick located in the vial so it will be contacted by the liquid in the vial. The recess is filled with a porous material 6, preferably of plaster of Paris, to provide an evaporating surface for the liquid raised by the wick.

A float 7, preferably of cork or the like, encircles the vial to hold it in upright position in the liquid of the pail, with its upper end projecting above the said liquid. A hanger 8, of wire or the like, has its ends inserted in the float, with the lower part of the hanger extending across the bottom of the vial. This part carries the weight 9 which acts to hold the vial in upright position, as shown in Fig. 1.

In the modification shown in Fig. 4 the float and weight are omitted and the vial is supported by a cable 10 from the handle of the pail.

The vial contains liquid chemical compounds and liquid mixtures which are chemotropic to economic insects. The insects are lured by the odors liberated by the chemicals used in the vial and the attracted insects are trapped in the liquid in the pail over which the vial is suspended, or in which the vial is floated.

The vial is made to hold small amounts of pure chemicals or mixtures of pure chemicals which are too volatile to be used in open containers. In the vial, constructed as specified, they can be used for long periods of time, because the construction of the vial limits the amount of liquid which is lost by evaporation and provides a constant odor over the period of time used.

The small wick draws the liquid chemotropic bait from the glass vial up through a small hole in the cork of the vial. The end of the wick terminates in the evaporating surface of plaster of Paris. The porous plaster allows the odors of the liquid supplied by the wick to diffuse slowly and continuously. The amount of liquid lost can be regulated by the amount of plaster surface, the size of the wick, and the size of the hole in the cork.

The invention provides a method of using chemical compounds as bait for the trapping of noxious insects.

The cork float prevents the tipping of the vial, brings the diffusing surface close to the surface of the water in the trapping container, and reduces the exposed surface area of the cork, thus giving the maximum surface of water to trap insects which are attracted to the odors liberated by the chemicals, the weight and cork are balanced so that the vial is floated with its top just above the surface of the water in the trapping pail when the vial is filled. The weight is heavy enough to prevent the tipping of the cork which would submerge the top of the vial and render the device useless.

The float increases the efficiency of the invention by allowing it to be floated in the trapping container. By bringing the source of the odor close to the water, insects lured into the trapping container by it are trapped more effectively than when the vial is suspended above the water's surface by other methods.

It is thought from the foregoing description that the advantages and novel features of the invention will be readily apparent.

It is to be understood that changes may be made in the construction, combination and arrangement of the several parts, provided such changes fall within the scope of the appended claims.

What I claim and desire to protect by Letters Patent is:

1. A holder for liquid bait, comprising a vial, a stopper closing the upper end thereof and having a recess in its top part and a groove in its side extending longitudinally downward from said recess, a porous filling in the recess and a wick for conveying liquid from the vial into the filling the upper end of the wick being located in said groove to lie between the stopper and the upper part of the vial.

2. A holder for liquid bait, comprising a vial, a stopper closing the upper end thereof and having a recess in its top part and a groove in its side extending longitudinally downward from said recess, a porous filling in the recess, a wick for conveying liquid from the vial into the filling the upper end of the wick being located in said groove to lie between the stopper and the upper part of the vial, and means for holding the vial in a body of liquid with its upper end projecting from the liquid.

3. A holder for liquid bait, comprising a vial, a stopper closing the upper end thereof and having a recess in its top part and a groove in its side extending longitudinally downward from said recess, a porous filling in the recess, a wick for conveying liquid from the vial into the filling the upper end of the wick being located in said groove to lie between the stopper and the upper part of the vial, and means for holding the vial in a body of liquid with its upper end projecting from the liquid, such means comprising a float.

4. A holder for liquid bait, comprising a vial, a stopper closing the upper end thereof and having a recess in its top part and a groove in its side extending longitudinally downward from said recess, a porous filling in the recess, a wick for conveying liquid from the vial into the filling the upper end of the wick being located in said groove to lie between the stopper and the upper part of the vial, means for holding the vial in a body of liquid with its upper end projecting from the liquid, such means comprising a float carrying a stirrup having its ends held in the float and its middle portion passing beneath the vial, and a weight for holding the vial in upright position.

5. A holder for liquid bait, comprising a vial, a stopper closing the upper end thereof and having a recess in its top part and a groove in its side extending longitudinally downward from said recess, a porous filling in the recess, a wick for conveying liquid from the vial into the filling the upper end of the wick being located in said groove to lie between the stopper and the upper part of the vial, means for holding the vial in a body of liquid with its upper end projecting from the liquid, such means comprising suspension means for connecting the vial with a support above the liquid.

6. A holder for liquid bait comprising a vial having a bore of uniform diameter throughout its length, a cylindrical stopper disposed in the vial and having a recess in its periphery of increasing area toward its outer end, a wick disposed in the recess with its end extending into the increased area thereof and a porous filling within the increased area of the recess and engaging that area of the wick therein.

JOHN T. MEDLER.